United States Patent

[11] 3,607,688

| [72] | Inventors | Seiichi Inoue<br>3, Hayakurakuen-cho, Nara-shi, Nara-ken;<br>Kuniichi Hayashi, Yamaguchiken; Minoru<br>Tamura, Yamaguchiken; Masaya<br>Kamiyoshi, Yamaguchiken, all of Japan |
|---|---|---|
| [21] | Appl. No. | 792,152 |
| [22] | Filed | Jan. 17, 1969 |
| [45] | Patented | Sept. 21, 1971 |
| [73] | Assignee | said Inoue, by said Hayashi, Tamura and Kamiyoshi |

[54] TREATING SEA WATER WITH PRODUCTION OF CHLORINE AND FERTILIZER
6 Claims, No Drawings

| [52] | U.S. Cl. | 204/90, 204/151, 204/180 P |
|---|---|---|
| [51] | Int. Cl. | B01k 1/00 |
| [50] | Field of Search | 204/151, 180 P, 90; 210/47 |

[56] References Cited

UNITED STATES PATENTS

| 389,781 | 9/1888 | Webster | 204/151 X |
|---|---|---|---|
| 572,512 | 12/1896 | Albert | 204/90 |
| 707,886 | 8/1902 | Wiborgh et al. | 204/90 |
| 3,337,433 | 8/1967 | Miller | 204/86 |

*Primary Examiner*—John H. Mack
*Assistant Examiner*—A. C. Prescott
*Attorney*—Harold A. Dreckman ABSTRACT: This method of purifying sea water, together with the production of chlorine and fertilizer, consists of treating saline water in a two-compartment electrolytic cell in which the two compartments of the cell are separated by a porous membrane. The saline water is electronically treated to produce potable water, as well as chlorine and a fertilizer which is commercially usable in agriculture.

TREATING SEA WATER WITH PRODUCTION OF CHLORINE AND FERTILIZER

An object of this invention is to separate various chemicals from sea water or other saline waters, the remainder being usable either industrially or for human consumption.

Another object of our invention is to provide a two chambered cell separated by a porous membrane, and where the salt or saline waters are introduced into one cell continuously as long as electrical current is transmitted through the cell.

Other objects, advantages and features of invention may appear from the accompanying detailed description and the appended claims.

This detailed description will begin with a brief explanation of a cathode reaction in electrolysis, as follows: As is commonly known, sea water usually contains sodium chloride which is its principal component, and also small quantities of magnesium salts, calcium salts and potassium salts, etc. The sea water is poured into the cathode compartment of a two-compartment electrolytic cell. This cell is made of a material that has a low hydrogen overvoltage such as iron, for example, and which has the cathode in it, i.e., the electrolytic cell wherein the cathode and anode are separated by a porous membrane. To the sea water is added, in advance, a suitable volume of phosphate, while electrolyzing it. Various phosphates will be precipitated, as the pH value rises. As long as the pH value of catholyte remains slightly acid about 5.5, calcium phosphate will be mainly precipitated. However, if said pH value rises higher than above-mentioned, then magnesium as well as potassium will be precipitated. When pH value reaches 10–11, most of the calcium, magnesium and potassium will be precipitated. If the amount of phosphoric acid added to the sea water has moles equal to the amounts of magnesium (the amount of magnesium ions, to be exact), then the phosphate will be almost completely fixed at 10–11 of pH value. The magnesium and potassium appear to be fixed as a form of magnesium potassium phosphate. The chemical composition of precipitates in electrolysis, while maintaining the pH value of the catholyte at 10.5 by adding stoichiometric amounts of phosphoric acid to sea water and may be illustrated as follows: $MgO = 16.5\%$, $CaO = 5.0\%$, $2O = 4.0\%$, $Na_2O = 6.4\%$, $P_2O_5 = 30.5\%$, $H_2O = 36.6\%$.

The ratio of Mg:Ca:K, which are precipitates resulting from electrolysis under the conditions where the pH value of catholyte is maintained higher, is similar to the ratio of Mg:Ca:K of the used sea water or a similar saline water. When said pH value falls, the rate of fixation of potassium becomes lower also and the chemical composition of precipitates will change.

The adjustment of the pH value of catholyte when electrolyzing sea water and with addition of phosphoric acid by the use of a two-compartment electrolytic cell; is achieved by the mutual adjustment between an electric current and the rate of supply of sea water containing phosphoric acid into the electrolytic cell. In other words, the balance is kept in the pH value where the amount of hydrogen ions actually consumed in the cathode compartment. The difference between hydrogen ions in the electrolyte introduced into the electrolytic cell and hydrogen ions in the catholyte discharged out of the system will be equal to the theoretical amount of consumption of hydrogen ions determined by the electric current. In the actual electrolysis it is desirous to flow sea water with added phosphoric acid into the cathode compartment at the speed of the current required to maintain the pH value of catholyte at a certain level, and that, in order to stir up well, to force the catholyte to circulate at the speed of the current several times or several tens times as rapidly as the above-mentioned speed of the current. During electrolysis, therefore, it is preferable to arrange a cyclater by a suitable apparatus in the circulation system of catholyte so as to promote the supply of sea water with added phosphoric acid to separate the precipitates and discharge the liquid.

When using a saline water other than sea water as a material, it is necessary to alter the adding amount of phosphoric acid according to the chemical composition of said material. Since produced precipitates are perfectly soluble in 2% citric acid, they can be used as a long-lasting fertilizer. But, if they should be treated in ammonium bicarbonate solution, they will become magnesium ammonium phosphate and potassium bicarbonate. Magnesium ammonium phosphate is a soluble fertilizer, while potassium bicarbonate is a raw material for production of potassium salts.

Phosphoric acid, which is added in advance to sea water, may be of low purity fit for a fertilizer, For example, the chemical composition of phosphoric acid for a fertilizer is as follows:

$P_2O_5$......43.0%   $SO_4$......6.2%   $Fe^{3+}$......2.0%
$Mg^{2+}$......0.8%   $Al^{3+}$......2.0%   $F^-$......2.6%

Besides, there will be, as a foreign matter, a small quantity of $SiO_3^{2-}$. Although a certain quantity of impurities is contained, the relative amount of phosphoric acid against sea water or a saline water, is very small, so that there is no trouble that said impurities in phosphoric acid will interfere with electrolysis.

When a dilute solution of sodium chloride such as sea water is electrolyzed, a certain amount of oxygen will be produced on account of electric discharge of hydroxide ions, in addition to chlorine produced by discharge of chlorine ions and, as long as required for production of chlorine, it is not economically feasible. Accordingly, in order to produce chlorine with a high current efficiency by electrolyzing a dilute solution of sodium chloride such as sea water, it is necessary to utilize U.S. Pat. No. 3,364,127 as a basis. This invention relates to the electrolyzing process in which the anode compartment of a two-compartment electrolyte cell with the anode and the cathode partitioned by the anion exchange membrane is filled with a concentrated chloride solution, which is 0.4% chlorine in water, such as sodium chloride, ferric chloride or aluminum chloride, etc., and then it is electrolyzed. In the cathode compartment where the cathode is placed is made of a material of low hydrogen overvoltage and the sea water with phosphoric acid added, as above-mentioned. Since anolyte is a concentrated chloride solution, the rate of discharge of chlorine ions is extremely high and the current efficiency of chlorine is more than 95%.

A portion of chlorine produced in the anode will dissolve in anolyte and, if it contacts the anion exchange membrane, the latter will be instantly corroded. It is, therefore, necessary to arrange a porous protecting membrane between the anion exchange membrane and the anode. Because of said protecting membrane being interposed as above-mentioned, the electrolyte cell appears to have three compartments: cathode, anode and intermediate compartments. But, as the anode and intermediate compartments contain the same electrolyte, the electrolytic cell is substantially a two-compartment electrolytic cell. As mentioned hereunder, a portion of anolyte must be taken out of the anode compartment and treated and then it should be returned, after treatment, to the intermediate compartment. By supplying anolyte into the intermediate compartment, dissolved chlorine which passes through said protecting membrane to enter into the intermediate compartment from the anode compartment, will be pushed back so as to protect the anion exchange membrane.

Said anion exchange membrane can selectively allow chlorine ions in the catholyte to pass through it. At the same time it also permits cations of the anolyte (such as sodium ions, ferric ions or aluminum ions, etc.) to pass through it, although small in amount. As a result, the amount of chlorine ions passing through the anion exchange membrane is usually smaller than that of chlorine ions which are discharged and consumed in the anode, which fact means that if electrolysis will be continued a long time solute in the anolyte will gradually decrease.

When chlorine ions pass through the anion exchange membrane and come into the anode compartment, they will accompany hydrated water. In addition, a water permeated electrically will enter into the anode compartment and the anolyte will be gradually diluted. In order to continue electrolysis, therefore, a portion of the anolyte must be taken out and an accumulated water in the anode compartment should be removed therefrom, while the gradually decreasing solute has to be replenished. The volume of water accumulated in the anode compartment has the porosity dependency and the membrane current density dependency of the anion exchange membrane, but they are generally less than 4–8 mol/F. The amount of solute to be replenished varies according to the transference number of the anion exchange membrane and a kind of cations. But there is the following order: $Na^+ > Fe^{3+} > Al^{3+4}$. If the anolyte is sodium chloride, it will be 0.050~0.15 mol/F. A portion of the anolyte taken out of the anode compartment is returned to the intermediate compartment of the electrolytic cell after the above-mentioned replenishment for dehydration and solute.

There is U.S. Pat. No. 3,163,599 which relates to the manufacturing process of chlorine and a citrate-soluble fertilizer. According to this invention, a saline water containing sodium phosphate and ammonia will be added to sea water so as to precipitate magnesium, calcium and the like of sea water, and the sea water without scale-forming elements will be evaporated and condensed so as to obtain fresh water as well as a concentrated saline water. A portion of said concentrated saline water will be electrolyzed in a diaphragm cell, so that chlorine will be obtained on the anode side, and a saline water containing caustic soda will be found on the cathode side. Phosphoric acid will be added to said catholyte in order to make a saline water containing sodium phosphate and the above-mentioned cycle of operation will be circulated.

The above-mentioned U.S. Pat. No. 3,163,599 has a similar object as the present invention so far as it aims at producing chlorine and citrate-soluble fertilizer from sea water. But these inventions are different from each other in the following three respects:

1. The electrolytic cells used in these inventions are entirely different from each other.
2. According to said U.S. Pat. No. 3,163,599, a phosphate fertilizer can be obtained by the external reaction of the electrolytic cell, while said fertilizer is obtained in the cathode compartment of the electrolytic cell according to the present invention.
3. In the invention of said U.S. Pat. No. 3,163,599, production of fresh water and concentrated sea water without scale-forming elements by evaporation and concentration of the sea water obtained after precipitation of a phosphate fertilizer is the essential requirement, while in our invention the utilization of a sea water without scale-forming elements has nothing to do with the substance of the invention.

A precipitating process of potassium magnesium phosphate by adding sodium phosphate to sea water has been published on P. 37 of the Saline Water Conversion 14 II (1963) issued by The American Chemical Society. But, as far as producing all potassium magnesium phosphate and chlorine at the same time is concerned, the present invention is the first.

According to the present invention, none of the magnesium, calcium and potassium-ions will be contained in the discharged catholyte, therefore it is profitable to make said fresh water by the distillation process. The most difficult problem in making fresh water out of sea water by the distillation process is that scales composed of calcium and magnesium salts become attached to the inside of the distillation apparatus. Consequently, it becomes difficult to raise the maximum temperature for evaporation as well as concentration, and thermal utilization cannot be improved enough, while the upper limit of concentration ratio will remain only about two times that of sea water. But, according to the present invention there is hardly any elements of scale-forming, so that both the maximum evaporation temperature and the concentration ratio of saline water can be raised as high as desired. As a result, the cost to make fresh water can be greatly lowered.

EMBODYING EXAMPLE 1

The anode compartment of the electrolytic cell wherein the anode and the cathode are partitioned with the anion exchange membrane and the protective membrane was filled with a dense brine of 25% concentration, while into its cathode compartment, sea water with phosphoric acid (which is composed of 0.35 parts of phosphoric acid calculated in the form of $P_2O_5$ against 100 parts of sea water) was supplied at 5.7 l/F. At the same time, the liquid within the cathode compartment was circulated at a speed 45 times that of supplied sea water, while electrolyzing. The result was the precipitation of the following compositions under pH 10.9 of the discharged liquid from the cathode compartment:

| MgO......17.0% | CaO......8.6% | $K_2$...... 4.3% |
| $Na_2O$......5.0% | $P_2O_5$......30.0% | $H_2O$...35.0% |

The current efficiency of $PO_4^{3-}$ on the side of the cathode was 99% while that of $Cl^-$ on the side of the anode was 98%. Almost all magnesium and calcium ions in sea water was precipitated, while 90% of potassium ions precipitated. In order to balance the addition and subtraction of materials in anolyte, the amount of water to be discharged was 6 mol/F. while the amount of salt to be added was 0.06 mol/F.

EMBODYING EXAMPLE 2

Into the cathode compartment of the same electrolytic cell, as used in example 1, there was supplied a saline water which was concentrated 2.5 times as much as the concentration of sea water (0.78 parts of phosphoric acid calculated in terms of $P_2O_5$ was added against 100 parts of the saline water) at 2.3 l./F, while the liquid of the cathode compartment was circulated 50 times as rapidly as the supplied saline water and it was electrolyzed at the same time. With pH 10.5 of the discharged liquid of the cathode compartment the precipitation of the following composition took place:

| MgO......16.0% | CaO......4.9% | $K_2O$......3.8% |
| $Na_2O$....6.0% | $P_2O_5$......30.8% | $H_2O$......36.0% |

The current efficiency of $PO_4^{3-}$ on the side of the cathode was 99% while that of $Si^-$ on the side of the anode was 98%. Almost all magnesium and calcium ions in the saline water precipitated, while potassium ions precipitated 91%. The addition and subtraction of substances in anolyte were balanced as follows: the amount of water to be discharged was 6 mol/F. while the amount of salt to be added was 0.05 mol/F.

While preferred embodiments have been described above in detail, it will be understood that numerous modifications might be resorted to without departing from the scope of the invention as defined in the following claims. Wherever sea water is mentioned it is understood that saline or brackish water is also included.

Having described our invention, we claim:

1. The process of treating sea water while producing chlorine and a citrate-soluble fertilizer comprising adding phosphoric acid to said sea water and electrolyzing the sea water, said sea water being poured into the cathode compartment of a two-compartment electrolytic cell which is partitioned with an anion exchange membrane, the cathode in the cathode compartment of the cell being made of material having a low hydrogen overvoltage, while the anion compartment of said cell is filled with a concentrated chlorine solution, whereby the catholyte discharge will contain said citrate-soluble fertilizer but be relatively free from scale forming ions.

2. The process of treating sea water while producing chlorine and a citrate-soluble fertilizer as recited in claim 1, and wherein the concentration of the chlorine solution is about 0.4 percent chlorine in water.

3. The process of treating sea water while producing chlorine and a citrate-soluble fertilizer as recited in claim 1, characterized by maintaining the pH of the discharged liquid of the cathode at 5.5~11.

4. The process of treating sea water while producing chlorine and a citrate-soluble fertilizer as recited in claim 1, and circulating the catholyte in the cathode compartment at a speed greater than 5 times the speed of the supplied sea water with phosphoric acid added which is poured into the cathode compartment of the electrolytic cell.

5. The process of treating sea water while producing chlorine and a citrate-soluble fertilizer as recited in claim 1, and wherein the concentration of the chlorine solution is about 0.4% chlorine in water, and circulating the catholyte in the cathode compartment at a speed greater than 5 times the speed of the supplied sea water with phosphoric acid added which is poured into the cathode compartment of the electrolytic cell.

6. The process of treating sea water while producing chlorine and a citrate-soluble fertilizer as recited in claim 1, characterized by maintaining the pH of the discharged liquid of the cathode at 5.5~11, and circulating the catholyte in the cathode compartment at a speed greater than 5 times the speed of the supplied sea water with phosphoric acid added which is poured into the cathode compartment of the electrolytic cell.